(12) United States Patent
Liu et al.

(10) Patent No.: US 9,047,345 B1
(45) Date of Patent: Jun. 2, 2015

(54) PROCESSING ANNOTATIONS FOR A SEARCH RESULT

(71) Applicant: Google Inc., Mountain View, CA (US)

(72) Inventors: Sean Yaoxing Liu, Sunnyvale, CA (US); Sagar Kamdar, Redwood City, CA (US); Rishi Khaitan, San Francisco, CA (US); Frances Bordwell Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 13/771,003

(22) Filed: Feb. 19, 2013

Related U.S. Application Data

(60) Provisional application No. 61/694,191, filed on Aug. 28, 2012.

(51) Int. Cl.
G06F 17/30 (2006.01)

(52) U.S. Cl.
CPC .................. *G06F 17/30525* (2013.01)

(58) Field of Classification Search
USPC ......... 707/726, 687, 705, 736, 758, 790, 813, 707/607
See application file for complete search history.

(56) References Cited

U.S. PATENT DOCUMENTS

2010/0223261 A1* 9/2010 Sarkar ........................ 707/726

* cited by examiner

*Primary Examiner* — Sana Al Hashemi
(74) *Attorney, Agent, or Firm* — Fish & Richardson P.C.

(57) ABSTRACT

A system and machine-implemented method for processing annotations for a search result. A social annotation by a first user for a search result is received. In response to receiving the social annotation, at least one suggested interaction associated with the search result is obtained. The at least one suggested interaction is provided for display to the first user.

20 Claims, 6 Drawing Sheets

FIG. 2A

PROCESSING ANNOTATIONS FOR A SEARCH RESULT

CROSS-REFERENCE TO RELATED APPLICATION

The present application claims the benefit of U.S. Provisional Patent Application Ser. No. 61/694,191, entitled "Processing Annotations For A Search Result," filed on Aug. 28, 2012, the contents of which are hereby incorporated by reference in its entirety for all purposes.

BACKGROUND

The present disclosure generally relates to processing annotations and, in particular, to processing annotations for a search result.

Social annotations on search results may be beneficial for users, particularly for determining the relevancy of the search results. Furthermore, when users annotate search results, this can help in understanding user interests.

SUMMARY

In one innovative aspect, the disclosed subject matter can be embodied in a method. The method comprises receiving a social annotation by a first user for a search result, obtaining, in response to receiving the social annotation, at least one suggested interaction associated with the search result, and providing for display of the at least one suggested interaction to the first user.

These and other embodiments can comprise one or more of the following features. The search result can correspond to a website or a topic. The social annotation can comprise an endorsement by the first user. The at least one suggested interaction can comprise at least one other social annotation by at least one second user. The first user and the at least one second user can be members of a social networking service. When the first user and the at least one second user are not social contacts in the social networking service, the method can further comprise providing a suggestion for the first user and the at least one second user to become social contacts in the social networking service. The at least one other social annotation can comprise an endorsement by the at least one second user. The at least one second user can correspond to an expert associated with the search result, and the at least one other social annotation can comprise a post by the expert on the search result. The expert can be selected from among other users associated with the search result, and the selection of the expert can be based on at least one of a quality of posts by the expert based on predetermined metrics, a number of followers of the expert, an amount of engagement with posts of the expert, or a frequency at which the expert submits posts. The at least one other social annotation can comprise a popular post associated with the search result. The popular post can be selected from among other posts associated with the search result, and the selection of the popular post can be based on at least one of a number of reads of the popular post, a number of comments of the popular post, a number of endorsements of the popular post, or a number of reshares of the popular post. The at least one suggested interaction can comprise at least one suggestion to add at least one other user as a social contact in a social networking service. The method can further comprise, prior to receiving the social annotation, receiving a search query by the first user, providing for performing a search based on the search query to obtain plural search results, and providing for display of the plural search results to the first user, the plural search results including the search result which receives the social annotation by the first user. The method can further comprise updating a storage device to include the social annotation by the first user. The storage device can include the at least one suggested interaction, and the obtaining the at least one suggested interaction can comprise accessing the storage device to obtain the at least one suggested interaction.

In another innovative aspect, the disclosed subject matter can be embodied in a system. The system comprises one or more processors, and a machine-readable medium comprising instructions stored therein, which when executed by the processors, cause the processors to perform operations comprising receiving a social annotation by a first user for a search result, wherein the social annotation comprises an endorsement by the first user, obtaining, in response to receiving the social annotation, at least one suggested interaction associated with the search result, and providing for display of the at least one suggested interaction to the first user.

These and other embodiments can include one or more of the following features. The at least one suggested interaction can comprise at least one other social annotation by at least one second user. The first user and the at least one second user can be members of a social networking service. When the first user and the at least one second user are not social contacts in the social networking service, the operations can further comprise providing a suggestion for the first user and the at least one second user to become social contacts in the social networking service.

In another innovative aspect, the disclosed subject matter can be embodied in a machine-readable medium. The machine-readable medium comprises instructions stored therein, which when executed by a system, cause the system to perform operations comprising receiving a search query by a user, providing for performing a search based on the search query to obtain plural search results, and providing for display of the plural search results to the first user. The operations further comprise receiving a social annotation by a first user for a search result of the plural search results, obtaining, in response to receiving the social annotation, at least one suggested interaction associated with the search result, and providing for display of the at least one suggested interaction to the first user.

Advantageously, the subject technology improves the user experience when socially annotating search results. In response to the social annotation, the user can be presented with relevant information, for example, suggested interactions including suggestions for contacts who also socially annotated the search result, posts by experts, or popular posts. Such presentation of relevant information can encourage, or create an incentive for, users to socially annotate search results.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

FIGS. 2A-2C illustrate example screen shots of processing annotations for a search result.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Social annotations on search results may be beneficial for users, particularly for determining the relevancy of the search results. Furthermore, when users annotate search results, this can help in understanding user interests, which can in turn be used to power experts and authorship. However, it can be difficult to encourage users to socially annotate (e.g., endorse, post) websites or topics corresponding to search results, because the immediate reward for doing so is generally lacking. For example, after a user endorses a website corresponding to a search result, the user generally receives no immediate feedback. Thus, it may be desirable to provide feedback to a user based on social annotations by the user.

The disclosed subject matter provides for encouraging the generation of social annotations by suggesting friends and posts. More particularly, the disclosed subject matter provides for processing annotations for a search result (e.g., corresponding to a website or a topic). A social annotation by a first user for a search result is received. In response to receiving the social annotation, at least one suggested interaction associated with the search result is obtained. The at least one suggested interaction is provided for display to the first user.

The social annotation can comprise an endorsement by the first user. The at least one suggested interaction can comprise at least one other social annotation by at least one second user. The first user and the at least one second user can be members of a social networking service. When the first user and the at least one second user are not social contacts in the social networking service, a suggestion can be provided for the first user and the at least one second user to become social contacts in the social networking service.

Figure 1:
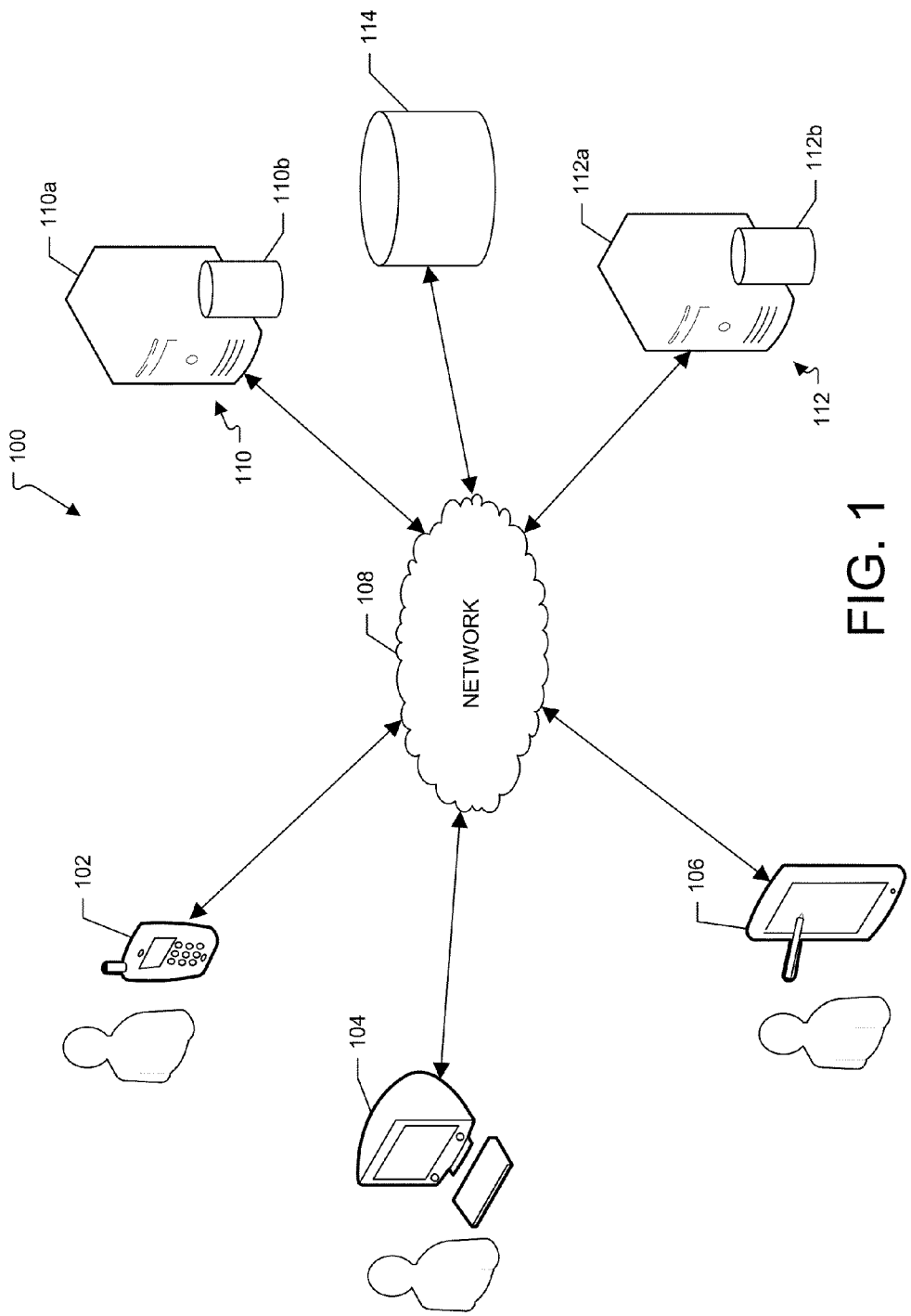
FIG. 1 illustrates an example network environment which provides for processing annotations for a search result.

FIG. 1 illustrates an example network environment which provides for processing annotations for a search result. A network environment 100 includes computing devices 102, 104 and 106, computing systems 110 and 112, and storage device(s) 114. Storage device(s) 114 can correspond to one or more databases. Computing devices 102-106, and computing systems 110-112 can communicate with each other, and can access storage device(s) 114, through a network 108. Each of computing systems 110-112 can include one or more computing devices 110a-112a (e.g., one or more servers), respectively, and one or more computer-readable storage devices 110b-112b (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 110a-112a may be provided access to or receive application software executed or stored on any of the other computing systems 102-106 and 110a-112a.

Each of computing devices 110a-112a may be any system or device having a processor, a memory, and communications capability for providing content to the electronic devices. In some example aspects, each of servers 110-112 can be a single computing device, for example, a computer server. In other embodiments, each of servers 110-112 can represent more than one computing device working together to perform the actions of a server computer (e.g., cloud computing). Further, each of computing devices 110a-112a can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 106), server (e.g., servers 110-112) and storage device (e.g., storage device(s) 114) can occur via a virtual private network (VPN), Secure Shell (SSH) tunnel, or other secure network connection. In some aspects, network 108 may further include a corporate network (e.g., intranet) and one or more wireless access points.

Storage device(s) 114 can be separate from computing system 110 or 112. Alternatively, storage device(s) 114 can be part of computing system 110 or 112 (e.g., storage device(s) 114 can correspond to one or more of storage devices 110b-112b).

In example aspects, storage device(s) 114 can store one or more social annotations (e.g., for search results, for example, topics or websites). For example, the social annotations can correspond to one or more social endorsements, ratings, posts, comments, messages, or other types of social annotations. Storage device(s) 114 can also be indexed. For example, information associated with the index can indicate whether an author of a social annotation (e.g., a post) is an expert for the search result (e.g., for a topic or website) In another example, information associated with the index can indicate whether a social annotation (e.g., a post) is a popular post.

In example aspects, processing device 110a executes computer instructions stored in data store 110b, for example, to host a social networking service. The social networking service hosted on server 110 may enable users (e.g., users of electronic devices 102-106) to create a profile and associate themselves with other users at the social networking service. A user of any of electronic devices 102-106 may interact with a social networking service hosted by server 110 through a client application installed at any of electronic devices 102-106. Alternatively, the user may interact with the social networking service through a web-based browser application at any of electronic devices 102-106.

For example, users interacting with electronic devices 102-106 can participate in social networking by posting messages, for example, text communications (e.g., comments, replies, announcements, status updates), digital photos, videos, or other appropriate electronic information. Further, users interacting with electronic devices 102-106 can participate in social networking by creating and changing social graphs.

In addition, the social networking service hosted by server 110 can allow a user to socially annotate (e.g., via social endorsement, post, rating) a search result, for example, a topic or a website within the social networking service. For example, the social networking service can provide an interface for entering social annotations. If a user submits a new social annotation for a search result, the social networking service may issue a request to storage device(s) 114 to create the social annotation in association with the search result. Further, if a user comments on or otherwise responds to an existing social annotation, the social networking service may issue a request to storage device(s) 114 to access the social annotation, and to update the social annotation based on the comment or response. As such, any updates for social annotations can be accessed later by the social networking service, or by other systems, for example, a search engine system.

In this regard, and in example aspects, processing device 112a executes computer instructions stored in data store 112b, for example, to host a search engine system. The search engine system can be usable by users at electronic devices 102-106. In this regard, server 112 may provide for accessing, fetching, aggregating, processing, searching, or maintaining documents (e.g., from the Internet).

Server 112 may implement a data aggregation service by crawling a corpus of documents (e.g., web documents), indexing entity location information (e.g., business locations) extracted from the documents, and storing the entity location information associated with the documents in a repository. The data aggregation service may be implemented in other ways, for example, by agreement with the operator(s) of server 112 to distribute content from their hosted documents via the data aggregation service.

The search engine system hosted on server 112 can perform a search in response to a query received from any of electronic devices 102-106, and can generate search results based on the query. The search results can be displayed in the form of a search results page for display on any of electronic devices 102-106.

In addition, the search engine system hosted by server 112 can allow a user to socially annotate (e.g., via social endorsement, post, rating, etc.) a search result, for example, a topic or a website. For example, the search engine system can provide an interface within the search results for entering social annotations. If a user submits a new social annotation for a search result, the search engine system may issue a request to storage device(s) 114 to create the social annotation in association with the search result. Further, if a user comments on or otherwise responds to an existing social annotation, the social networking service may issue a request to storage device(s) 114 to access the social annotation, and to update the social annotation based on the comment or response. As such, any updates for social annotations can be accessed later by the search engine system, or by other systems, for example, a social networking service (e.g., hosted by server 110).

Figure 2A:
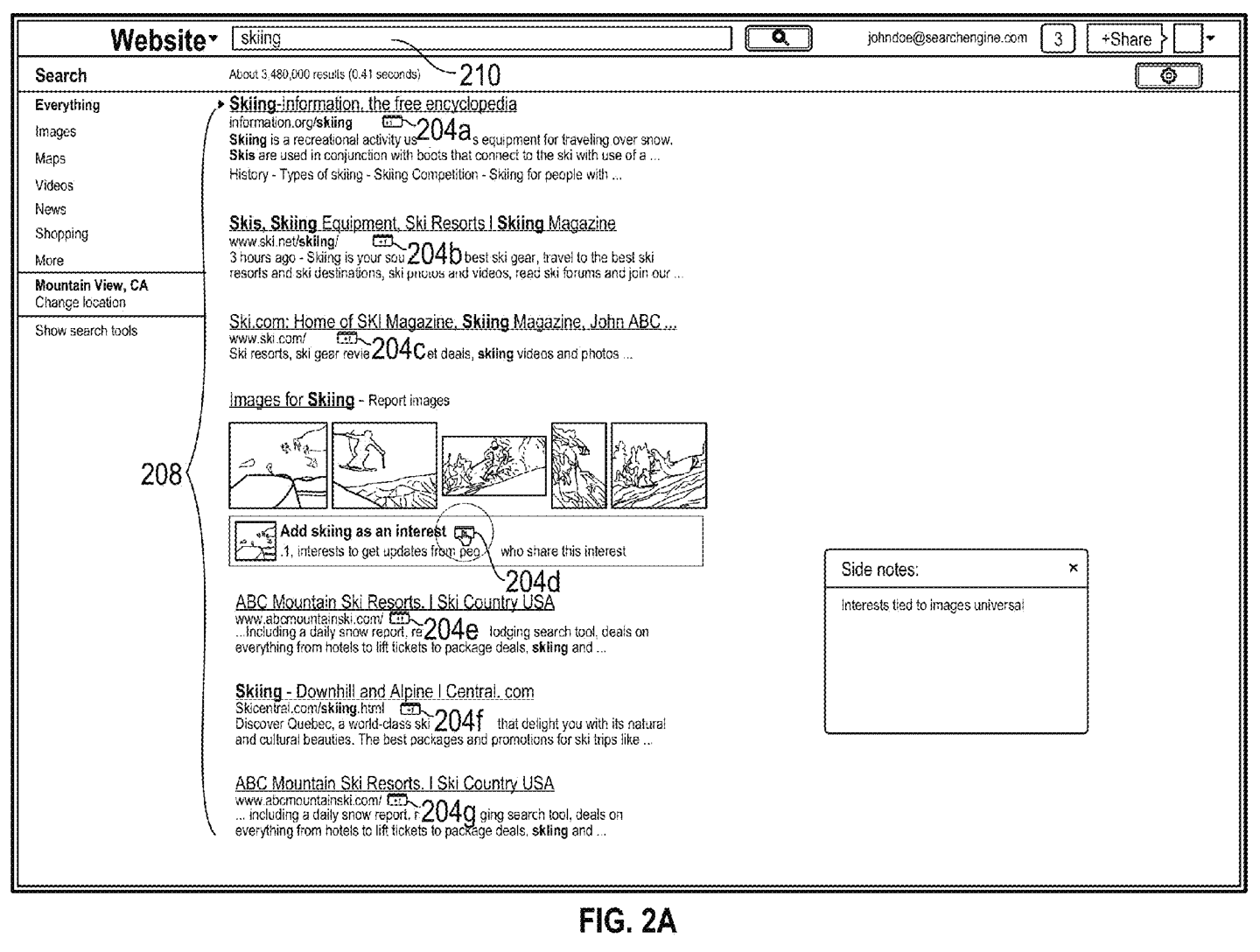
Figure 2B:
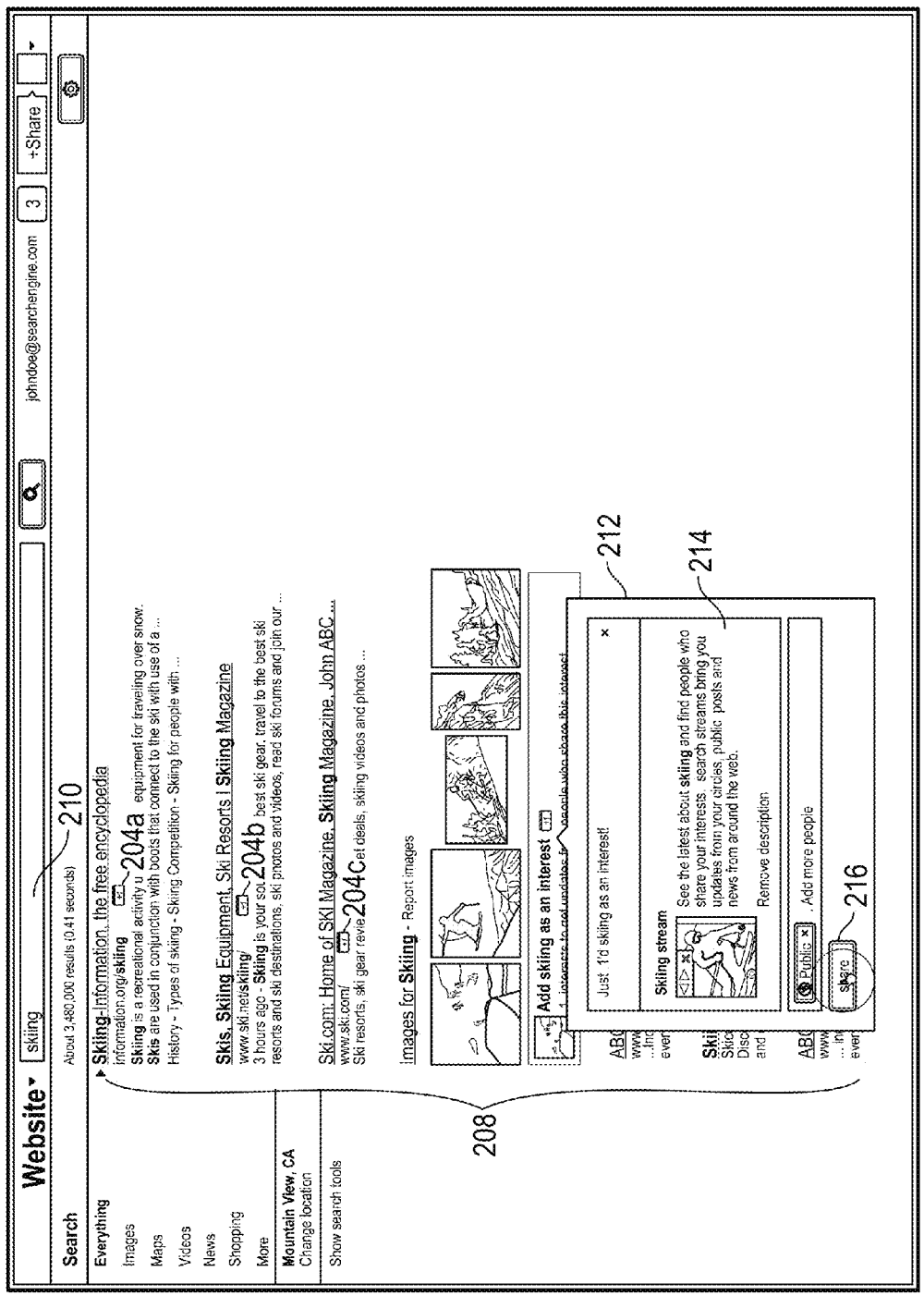
Figure 2C:
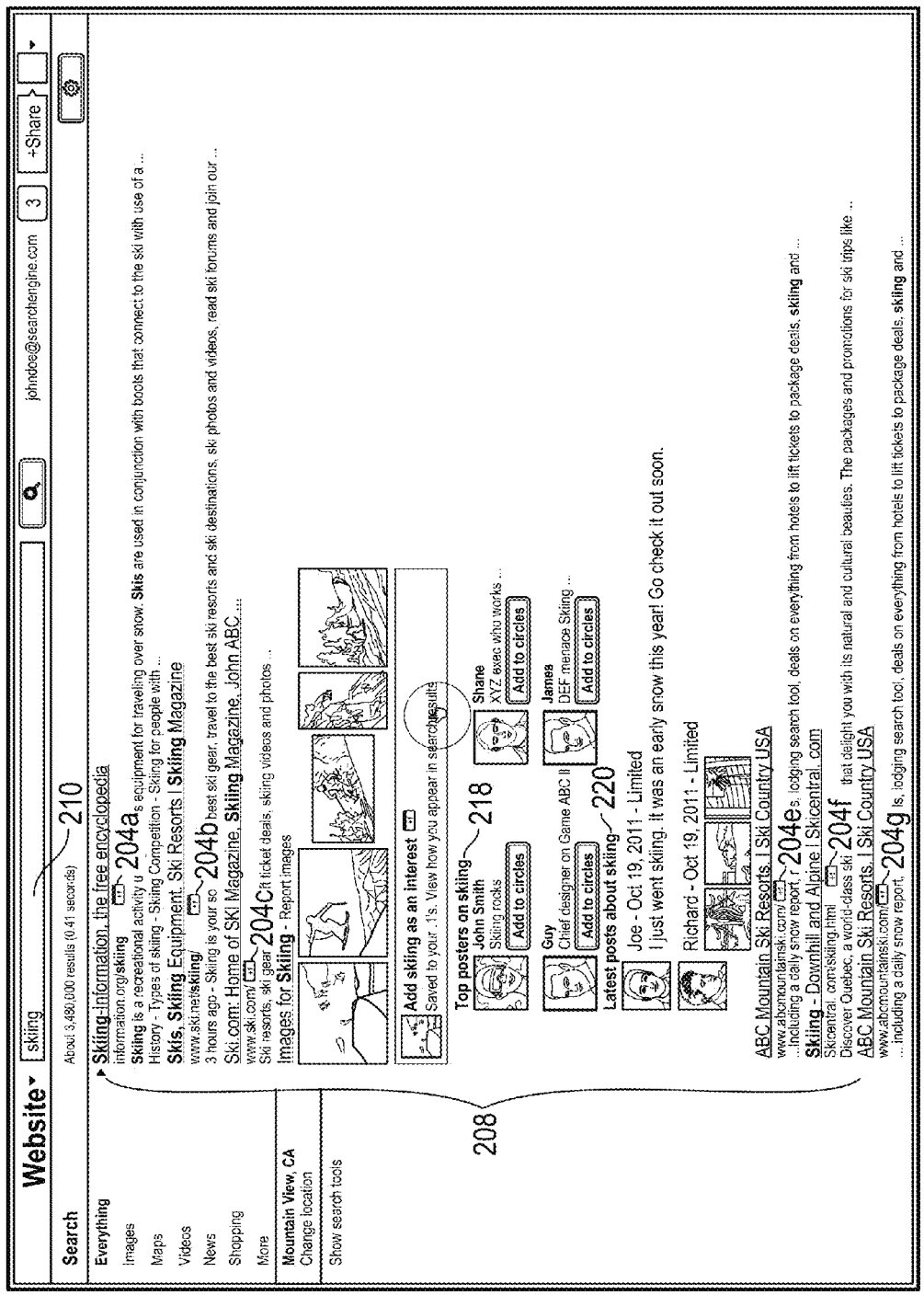

FIGS. 2A-2C illustrate example screen shots of processing annotations for a search result. In the examples of FIGS. 2A-2C, the search result corresponds to a topic. The term "topic" as used herein encompasses its plain and ordinary meaning, including, but not limited to a subject of discussion or conversation. Examples of topics include, but are not limited to, locations, events, activities, devices, sports, merchandise, businesses and people. In example aspects, the topic is predefined by a system, for example, a search engine system (e.g., hosted by server 112) or by a social networking service (e.g., hosted by server 110).

It should be noted that the processing of annotations is not limited to search results related to topics. In this regard, the processing of social annotations can apply to other types of search results, for example, websites or web pages (e.g., including text, images, audio or video content).

In FIG. 2A, search results 208 corresponding to a search query 210 (e.g., "skiing") are displayed within a web browser. For each of the search results 208, an interface 204a-204g can be provided for a user to socially annotate the search result. In the example of FIG. 2A, the interface is illustrated as a button (e.g., a "+1" button) which can be used to socially endorse the search result (e.g., website or topic). However, the interface for socially annotating search results 208 is not limited to a social endorsement, and can instead be for submitting a social post, comment, message, recommendation, or other type of social annotation.

A user can provide a social endorsement for the topic of skiing, via interface 204d. More specifically, interface 204d is displayed next to the topic entitled "Add skiing as an interest". After clicking user interface 204d, a suggested interaction associated with the search result can be presented to the user. For example, as can be seen in FIG. 2B, upon the user clicking interface 204d, a confirmation dialog 212 can be displayed to the user, confirming the social endorsement by the user for the topic of skiing. As noted above, other types of social annotations can be available to the user (e.g., social posts, comments, messages, recommendations, etc.). The confirmation dialog 212 can include reference to additional information 214 (e.g., a team skiing stream description). In addition, the confirmation dialog 212 can include a share interface (e.g., button 216), allowing the user to share his/her social annotation for the topic. The share interface (e.g., button 216) is one example of a suggested interaction associated with the search result. Using the share interface, the user can share the social annotation with contacts of the user within a social networking service (e.g., hosted by server 110).

Upon the user clicking button 216 for sharing his/her social annotation for the search result (e.g., the topic of skiing), related social information can be displayed regarding that search result. This related social information corresponds to other examples of suggested interactions that can be provided to the user, in response to the user socially annotating a search result (e.g., via user interface 204d). In the example of FIG. 2C, the related social information can include expert post data 218 and popular post data 220. However, the related social information is not limited to expert post data 216 and popular post data 220.

Expert post data 218 can correspond to authors of posts who are determined to be an expert for a topic. In example aspects, a score may be computed for each post entered by a user of a social networking service. The post can be entered within the social networking service website itself, or can be entered inline on other websites which are in communication with the social networking service (e.g., from the search engine system).

The score for each author can based on a number of factors, including, but not limited to, a quality of each of his/her posts based on predetermined metrics, a number of his/her followers, an amount of engagement with his/her posts, and a frequency at which he/she posts. In example aspects, these factors can be accessible from an expert index database (e.g., stored in storage device(s) 114). The expert index database can be constructed from log data which annotates all posts for particular authors, together with social interactions (e.g., to determine followers or engagements) for those posts.

The score can be used to determine whether the author is an expert (e.g., an expert on a particular topic). For example, the score for an author can be compared against a threshold score to determine if the author is an expert. In another example, only authors with highest scores (e.g., top 10 or top 100) may be considered and identified as experts. In addition, a social affinity of the experts with the given user can be calculated, for use in prioritizing display of experts for the given user. The social affinity can be calculated based on social graphs of a current user (e.g., who socially annotated a search result) and the expert.

In the example of FIG. 2C, the expert post data 218 includes a picture, name and title of the expert, as well as an interface (e.g., corresponding to a suggested interaction) to add the expert as a contact within the social networking service. However, expert post data 218 is not limited to such information.

For example, expert post data 218 can include posts by the expert related to the given search result. As another example of a suggested interaction, an entire expert post may be displayed inline on the search engine results page, so that the user may interact with the post, for example, by reading the post, commenting on the post or sharing the post inline on the search engine results page. If the user interacts with the post, the search engine system can communicate with the social networking service (e.g., via network 110 or storage device(s) 114), so that the user interaction is accessible from the social networking service.

In addition to expert post data 218, popular post data 220 can be provided. For example, scores can be calculated for social networking posts, without necessarily taking an expert level of the author into account. The score for each post can based on an amount of engagement with the post. For example, the score for a post can be based on factors including, but not limited to, the number of reads, comments, endorsements, and reshares for the post. In example aspects, these factors can be accessible from a popular index database (e.g., stored in storage device(s) 114). The popular index database can be constructed from log data which annotates all posts, together with social interactions (e.g., to determine engagements) for those posts.

The scores can be used to determine whether the post is a popular post. For example, the score for a post can be compared against a threshold score to determine if the post is popular. In another example, only posts with highest scores (e.g., top 10 or top 100) may be identified as popular posts.

In the example of FIG. 2C, the popular post data 220 includes a picture, name and title of the poster, as well as the content (or a portion of the content) corresponding to the post itself. As an example of a suggested interaction, the entire expert post may be displayed inline on the search engine results page, so that the user may read the post, comment on it or share it inline on the search engine results page. If the user interacts with the post, the search engine system can communicate with the social networking service (e.g., via network 110 or storage device(s) 114), so that the user interaction is accessible from the social networking service. It should be noted that popular post data 220 is not limited to the above information, and can include, for example, an interface to add the poster as a contact within the social networking service.

As noted above, the related social information is not limited to expert posts 218 and popular post data 220. For example, the related social information can include a list of other users of the social networking service who socially annotated (e.g., socially endorsed, posted, remarked on or recommended) the search result. The interests of these other users can be compared to interests of the current user based on information from the social networking service, and the similarity in interests can be used to prioritize the list.

For example, the list can be ordered such that users appearing at the top of the list share more similar interests with the current user than users appearing at the bottom of the list. In another example, the list can be filtered such that users who share enough similar interests with the current user (e.g., based on a threshold value) appear on the list, and users who do not share enough similar interests with the current user (e.g., based on a threshold value) do not appear on the list. This list corresponds to another example of a suggested interaction to the user who socially annotated a search result.

As such, as can be seen from FIGS. 2A to 2C, a user can socially annotate a search result, for example, a topic or a website. In response to the social annotation, the user can be presented with relevant information, for example, suggestions interactions including suggestions for contacts who also socially annotated the search result, posts by experts, or popular posts. Such presentation of relevant information can encourage, or create an incentive for, users to socially annotate search results.

Figure 3:
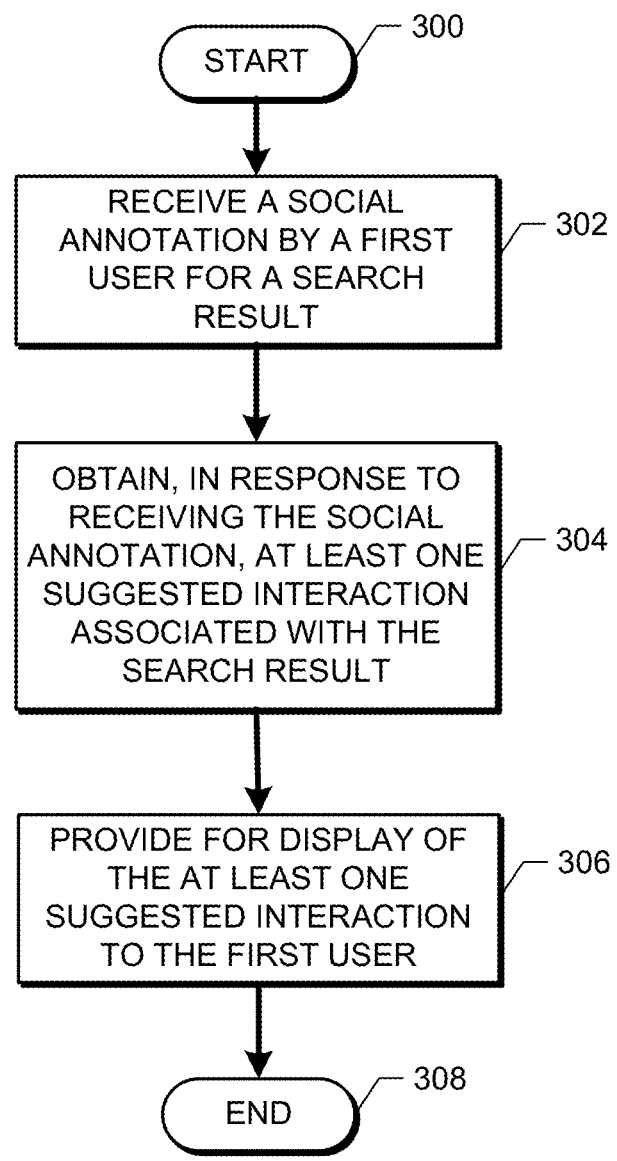
FIG. 3 illustrates an example process by which annotations for a search result are processed.

FIG. 3 illustrates an example process by which annotations for a search result are processed. Following start block 300, a social annotation by a first user for a search result is received at step 302. Prior to receiving the social annotation, a search query can be received by the first user, a search can be performed based on the search query to obtain plural search results, and the plural search results can be displayed to the first user, the plural search results including the search result which receives the social annotation by the first user.

The search result can correspond to a website or a topic. The social annotation can include an endorsement by the first user.

At step 304, in response to receiving the social annotation, at least one suggested interaction associated with the search result is obtained. A storage device can be updated to include the social annotation by the first user. The storage device can include the at least one suggested interaction, and the obtaining the at least one suggested interaction can include accessing the storage device to obtain the at least one suggested interaction.

The at least one suggested interaction can include at least one suggestion to add at least one other user as a social contact in a social networking service.

Alternatively, or in addition, the at least one suggested interaction can include at least one other social annotation by at least one second user. The first user and the at least one second user can be members of a social networking service. When the first user and the at least one second user are not social contacts in the social networking service, a suggestion can be provided for the first user and the at least one second user to become social contacts in the social networking service.

The at least one other social annotation can include an endorsement by the at least one second user. The at least one second user can correspond to an expert associated with the search result, and the at least one other social annotation can include a post by the expert on the search result. The expert can be selected from among other users associated with the search result, and the selection of the expert can be based on at least one of a quality of posts by the expert based on predetermined metrics, a number of followers of the expert, an amount of engagement with posts of the expert, or a frequency at which the expert submits posts.

The at least one other social annotation can include a popular post associated with the search result. The popular post can be selected from among other posts associated with the search result, and the selection of the popular post can be based on at least one of a number of reads of the popular post, a number of comments of the popular post, a number of endorsements of the popular post, or a number of reshares of the popular post.

At step 306, the at least one suggested interaction is provided for display to the first user. The process then ends at end block 308.

Figure 4:
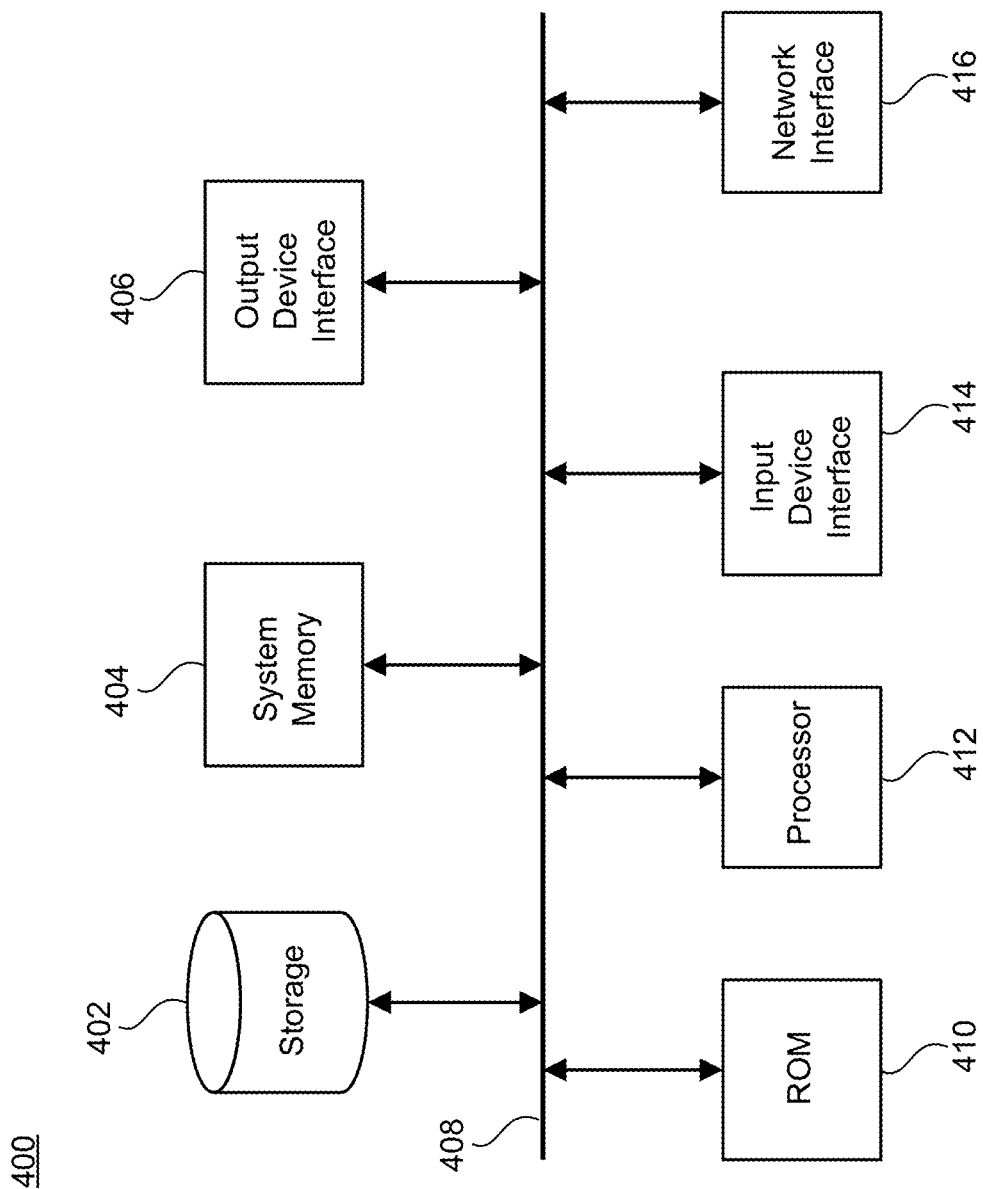
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for processing annotations for a search result in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method, the method comprising:
   providing, by one or more processors, one or more search results for display to a first user, at least one search result having an interaction element associated therewith, which when selected by the first user, induces social annotation of the at least one search result;
   receiving, by one or more processors, a social annotation by the first user for a search result in response to the first user selecting the interaction element, and in response:
      obtaining at least one suggested interaction associated with the search result, wherein the suggested social interaction is associated with an interaction conducted through a social networking service, and
      providing the at least one suggested social interaction for display to the first user.

2. The method of claim 1, wherein the search result corresponds to a website or a topic.

3. The method of claim 1, wherein the social annotation comprises an endorsement by the first user.

4. The method of claim 1, wherein the at least one suggested interaction comprises at least one other social annotation by at least one second user.

5. The method of claim 4, wherein the first user and the at least one second user are members of the social networking service.

6. The method of claim 5, wherein the first user and the at least one second user are not social contacts in the social networking service, the method further comprising providing a suggestion for the first user and the at least one second user to become social contacts in the social networking service.

7. The method of claim 4, wherein the at least one other social annotation comprises an endorsement by the at least one second user.

8. The method of claim 4, wherein the at least one second user corresponds to an expert associated with the search result, and wherein the at least one other social annotation comprises a post by the expert on the search result.

9. The method of claim 8, wherein the expert is selected from among other users associated with the search result, and wherein the selection of the expert is based on at least one of a quality of posts by the expert based on predetermined metrics, a number of followers of the expert, an amount of engagement with posts of the expert, or a frequency at which the expert submits posts.

10. The method of claim 4, wherein the at least one other social annotation comprises a popular post associated with the search result.

11. The method of claim 10, wherein the popular post is selected from among other posts associated with the search result, and wherein the selection of the popular post is based on at least one of a number of reads of the popular post, a number of comments of the popular post, a number of endorsements of the popular post, or a number of reshares of the popular post.

12. The method of claim 1, wherein the at least one suggested interaction comprises at least one suggestion to add at least one other user as a social contact in the social networking service.

13. The method of claim 1, further comprising, prior to receiving the social annotation:
   receiving a search query by the first user; and
   providing the plural search results for display to the first user, the plural search results including the search result which receives the social annotation by the first user.

14. The method of claim 1, further comprising:
   updating a storage device to include the social annotation by the first user.

15. The method of claim 14, wherein the storage device includes the at least one suggested interaction, and wherein the obtaining the at least one suggested interaction comprises accessing the storage device to obtain the at least one suggested interaction.

16. A system comprising:
   one or more processors; and
   a machine-readable medium comprising instructions stored therein, which when executed by the processors, cause the processors to perform operations comprising:
      providing one or more search results for display to a first user, at least one search result having an interaction element associated therewith, which when selected by the first user, induces social annotation of the at least one search result;
      receiving a social annotation by the first user for a search result in response to the first user selecting the interaction element, and in response:
         obtaining at least one suggested interaction associated with the search result, wherein the suggested social interaction is associated with an interaction conducted through a social networking service, and
         providing the at least one suggested social interaction for display to the first user.

17. The system of claim 16, wherein the at least one suggested interaction comprises at least one other social annotation by at least one second user.

18. The system of claim 17, wherein the first user and the at least one second user are members of the social networking service.

19. The system of claim 18, wherein the first user and the at least one second user are not social contacts in the social networking service, the operations further comprising providing a suggestion for the first user and the at least one second user to become social contacts in the social networking service.

20. A machine-readable medium comprising instructions stored therein, which when executed by a system, cause the system to perform operations comprising:
   receiving a search query by a user;

providing one or more search results for display to a first user, at least one search result having an interaction element associated therewith, which when selected by the first user, induces social annotation of the at least one search result;

receiving a social annotation by a first user for a search result in response to the first user selecting the interaction element, and in response:

obtaining at least one suggested interaction associated with the search result, wherein the suggested social interaction is associated with an interaction conducted through a social networking service, and providing the at least one suggested social interaction for display to the first user.

* * * * *